United States Patent [19]
Zackovich

[11] Patent Number: 6,071,065
[45] Date of Patent: Jun. 6, 2000

[54] SAFETY BRAKE APPARATUS FOR A VEHICLE LIFTING AND TOWING MECHANISM

[76] Inventor: Stanley E. Zackovich, 409 Floral Ave., Cle Elum, Wash. 98922

[21] Appl. No.: 09/152,006

[22] Filed: Sep. 11, 1998

[51] Int. Cl.⁷ .................................................. B60P 3/12
[52] U.S. Cl. ........................................ 414/563; 212/292
[58] Field of Search ................................ 414/563, 542, 414/742; 212/292, 261; 254/124; 280/402

[56] References Cited

U.S. PATENT DOCUMENTS

| | | | |
|---|---|---|---|
| 4,000,823 | 1/1977 | Aquila | 414/563 |
| 4,798,509 | 1/1989 | Bubik | 414/563 |
| 4,874,285 | 10/1989 | Bubik | 280/402 |
| 5,713,714 | 2/1998 | Walters | 414/563 |
| 5,853,283 | 12/1998 | Grant | 414/563 |

*Primary Examiner*—Dean J. Kramer
*Assistant Examiner*—Paul Chin
*Attorney, Agent, or Firm*—Stratton Ballew PLLC

[57] ABSTRACT

A safety brake apparatus for a vehicle lifting and towing mechanism is provided that includes a minimum of a single riser plate mounted near the top of the vehicle lift's riser member. The riser plate includes a slider plate keyway and a cam bracket. A slider plate is received onto the riser plate. The slider plate includes a slider plate key and at least a single post rest. The slider plate key is received into the slider plate keyway of the riser plate. A brake actuator is also mounted to the riser plate. The brake actuator slides the slider plate from a rearward or retracted position, to a forward or safety position, as the slider plate key travels forward or rearward within the riser plate keyway. In the safety position, the boom of the vehicle lifting apparatus is prevented from lowering. The boom is attached to the riser member and pivotably mounted to a frame member. The safety brake helps to minimize the potential hazards encountered in failures of hydraulic systems that are utilized in lifting mechanisms. The safety apparatus can be mounted on a towing vehicle and is especially suited for a retro-fit installation.

5 Claims, 18 Drawing Sheets

SAFETY BRAKE APPARATUS FOR A VEHICLE LIFTING AND TOWING MECHANISM

TECHNICAL FIELD

The invention relates to a safety brake apparatus, and more particularly to an apparatus for a safety brake for use in a vehicle lifting mechanism and especially suited for a tow truck.

BACKGROUND OF THE INVENTION

The vehicle towing industry requires lifting mechanisms for safely lifting heavy objects, such as disabled vehicles. These lifting mechanisms are typically attached to tow trucks. One required function of a tow truck's lifting mechanism is to lift an end of a vehicle and safely enable its transport without damage to the vehicle. Safely lifting a heavy object requires a mechanism that includes simple safety features. Such safety features should be easily or automatically activated to help eliminate the potential of injury or damage.

Most conventional tow truck lifting mechanisms rely on hydraulic actuators to supply the significant force required to lift the disabled vehicle. Hydraulic actuators, though ideally suited for such heavy duty use, can fail. Hydraulic actuators rely on a pressurized fluid to operate and often to maintain a desired position. An interruption or loss of hydraulic fluid pressure poses a serious safety hazard. Significant numbers of tow truck operators are injured on the job, by events directly stemming from a sudden failure of the hydraulic system. Once the hydraulic system fails, the lifting mechanism will suddenly travel to a resting position, often allowing the vehicle to fall to the ground, potentially harming anything in its path. Therefore, a need exists for an apparatus that helps to minimize the potential hazards encountered in failures of hydraulic systems that are utilized in lifting mechanisms.

Tow trucks are typically retrofitted with lift mechanisms. A lift mechanism manufacturer receives a tow truck at its factory, where the lift mechanism is then added. Ideally, a safety apparatus incorporated into such a retrofit lift mechanism would need to be simple and economical. An additional need exists for a safety apparatus that easily accommodates the lifting mechanism of a tow truck that is especially suited for a retrofit installation.

Other industries, where heavy objects are routinely lifted, would also benefit from an apparatus that provides safety for lifting mechanisms. Additionally, other lifting actuator types than those utilizing hydraulics, could also benefit from an apparatus that reduces the potential of damage or injury that can result from the failure of the lifting actuator.

SUMMARY OF INVENTION

According to the invention, an apparatus for a safety brake is provided. The present invention incorporates the safety brake apparatus into a specifically configured vehicle lifting mechanism. The safety brake is especially suited for a vehicle lifting mechanism utilized in a tow truck. As with the conventional vehicle lifting mechanism, the vehicle lifting mechanism of the present invention is conventionally hydraulically actuated.

The specifically configured vehicle lifting mechanism for use with the present invention includes a riser member and a boom. The riser member has a base mounted to the boom of the vehicle lifting mechanism. The safety brake apparatus includes a minimum of a single riser plate mounted near the top of the riser member. The riser plate includes a slider plate keyway and a cam bracket. A slider plate is received onto the riser plate. The slider plate includes a slider plate key and at least a single post rest. The slider plate key of the slider plate is received into the slider plate keyway of the riser plate. A brake actuator is also mounted to the riser plate. The brake actuator slides the slider plate from a rearward or retracted position, to a forward or safety position, as the slider plate key travels forward or rearward within the riser plate keyway.

According to an aspect of the invention an apparatus for a safety brake is provided that helps to minimize the potential hazards encountered in failures of hydraulic systems that are utilized in lifting mechanisms. Besides hydraulics, other actuator types could also benefit from an apparatus that helps reduce the potential of damage or injury that can result from the failure of the actuator.

According to another aspect of the invention, the safety apparatus is mounted on a towing vehicle.

According to another aspect of the invention a safety apparatus is provided that easily accommodates the lifting mechanism of a tow truck and is especially suited for a retro-fit installation.

According to a related aspect of the invention, an apparatus for a safety brake is provided that can be utilized in situations whenever heavy objects are routinely lifted by mechanical devices capable of incorporating the present invention.

DETAILED DESCRIPTION OF SPECIFIC EMBODIMENTS

Figure 1:
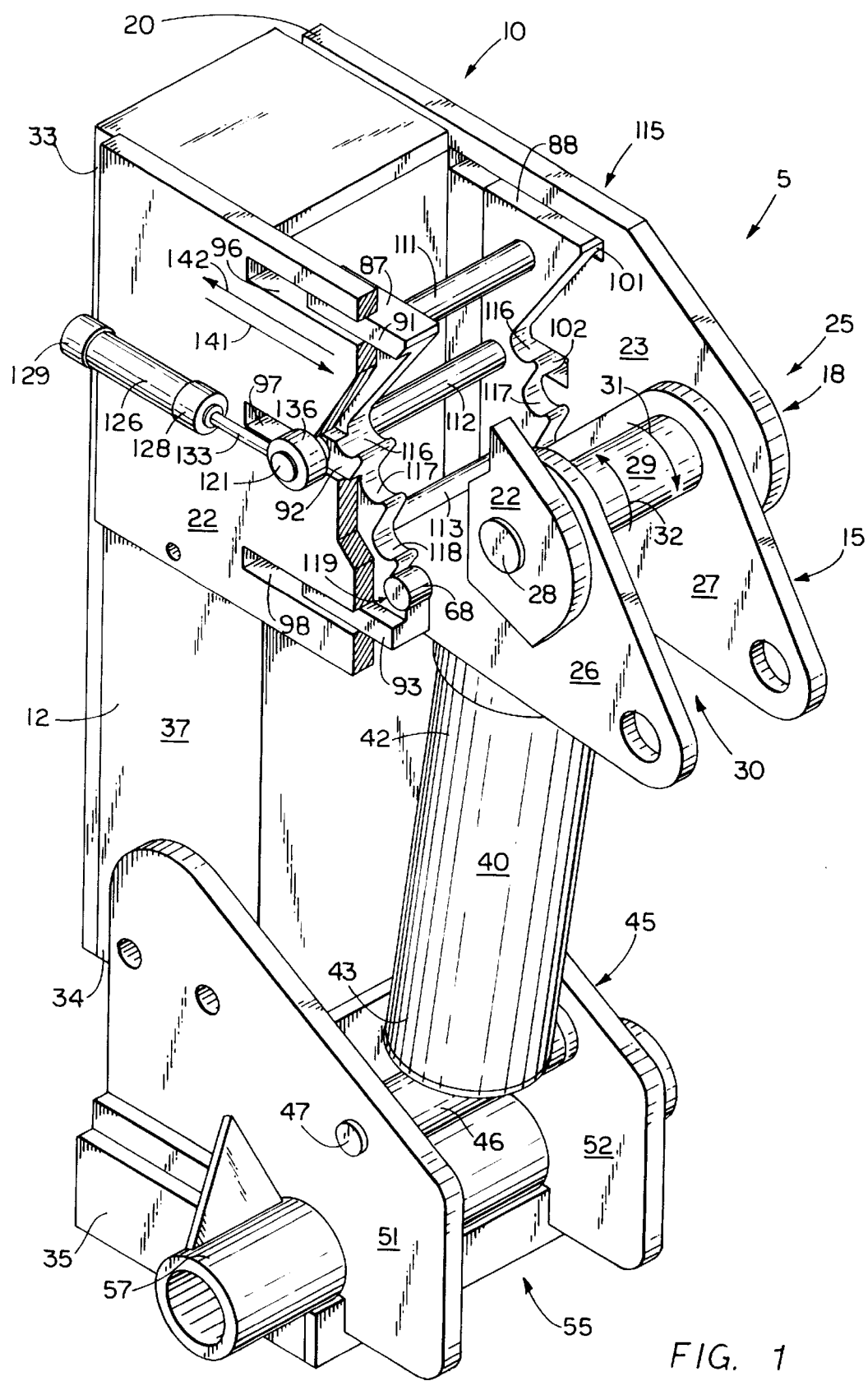
FIG. 1 is a cut away perspective diagram of a safety brake apparatus for a lifting mechanism, according to an embodiment of this invention.
Figure 19:
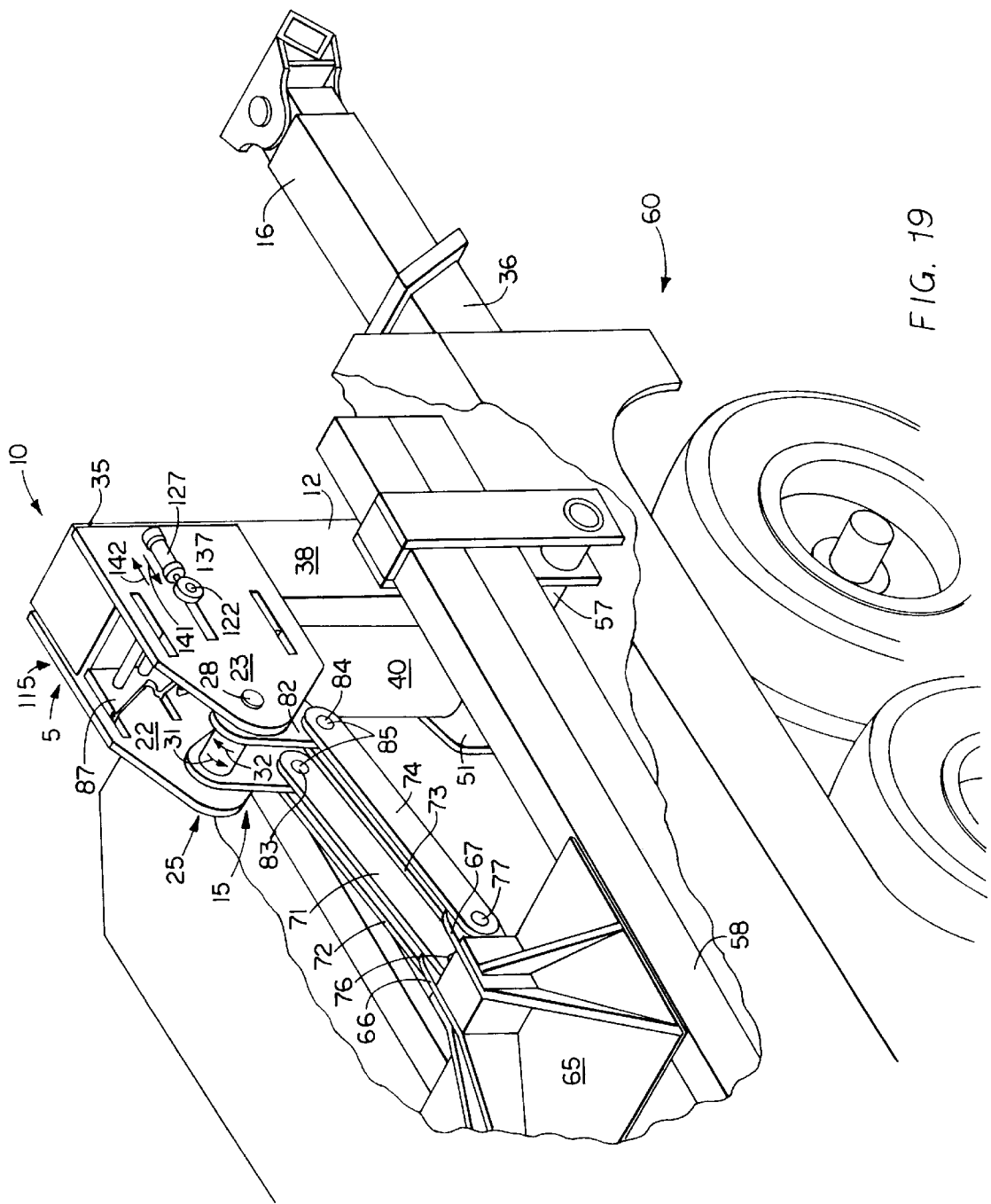
FIG. 19 is a cut away perspective diagram of the safety brake for a lifting mechanism, according to an embodiment of this invention.

The invention provides a safety brake apparatus for a lifting mechanism. The safety brake apparatus is incorporated into and is especially suited for the lifting mechanism of a towing vehicle. FIG. 1 shows the safety brake apparatus 5, according to an embodiment of this invention, as mounted upon a riser member 12 of the lifting mechanism 10. The lifting mechanism can operate without the safety brake of the present invention or can be retrofitted with the safety brake apparatus as discussed later herein. According to an embodiment of this invention, FIG. 19 shows the safety brake apparatus as mounted upon a frame member 58 of the towing vehicle 60.

The lifting mechanism 10 employing the safety brake apparatus 5 according to an embodiment of the present invention is shown in FIGS. 1 through 19. The lifting mechanism includes a camming crank 15 received into to a cam bracket 18. Preferably, as shown in FIGS. 1, 2, 10, 11, 12, 17, 18 and 19, the cam bracket is formed within a pair of riser plates 20. Alternatively, a single riser plate could be utilized, however for strength and a symmetrical transfer of forces, the pair of riser plates are most preferred.

Figure 8:
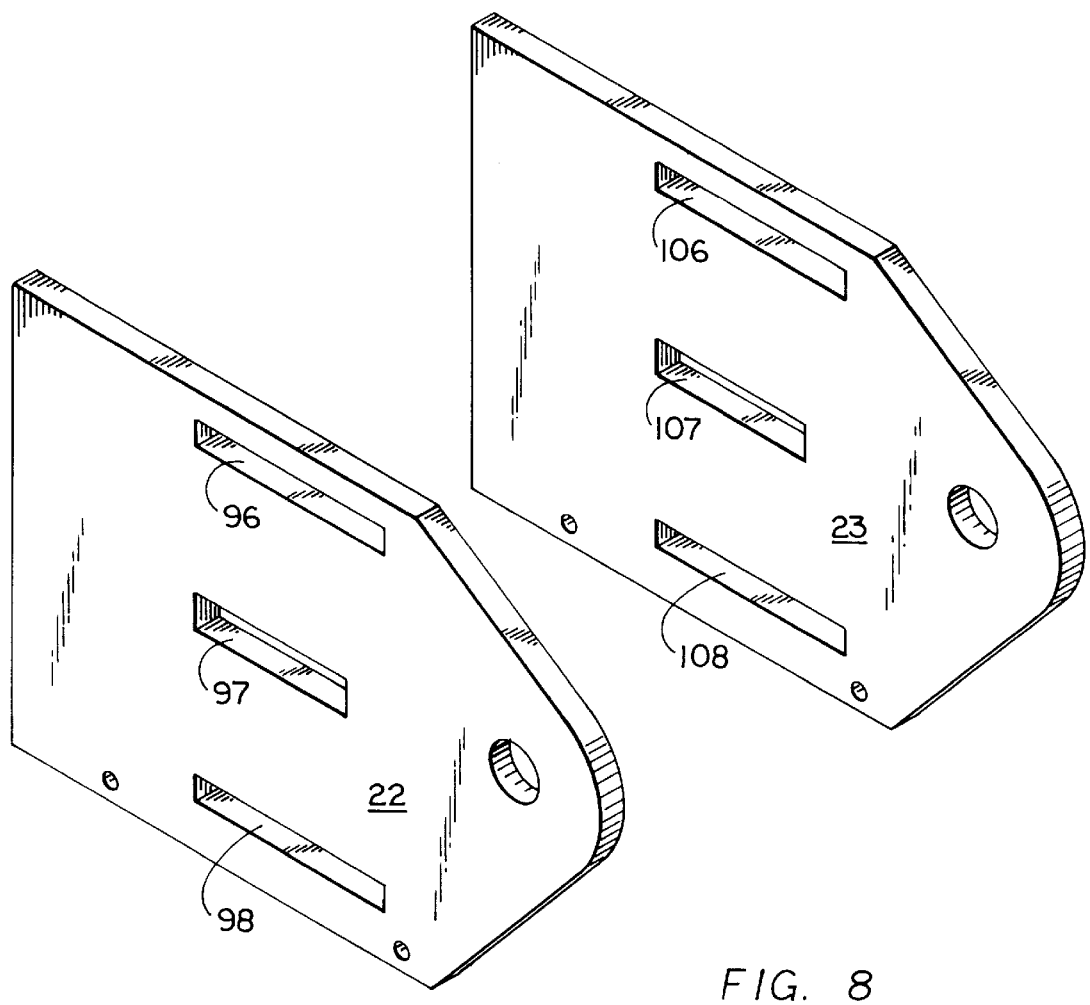
FIG. 8 is a portion of the safety brake apparatus, according to an embodiment of this invention.
Figure 9:
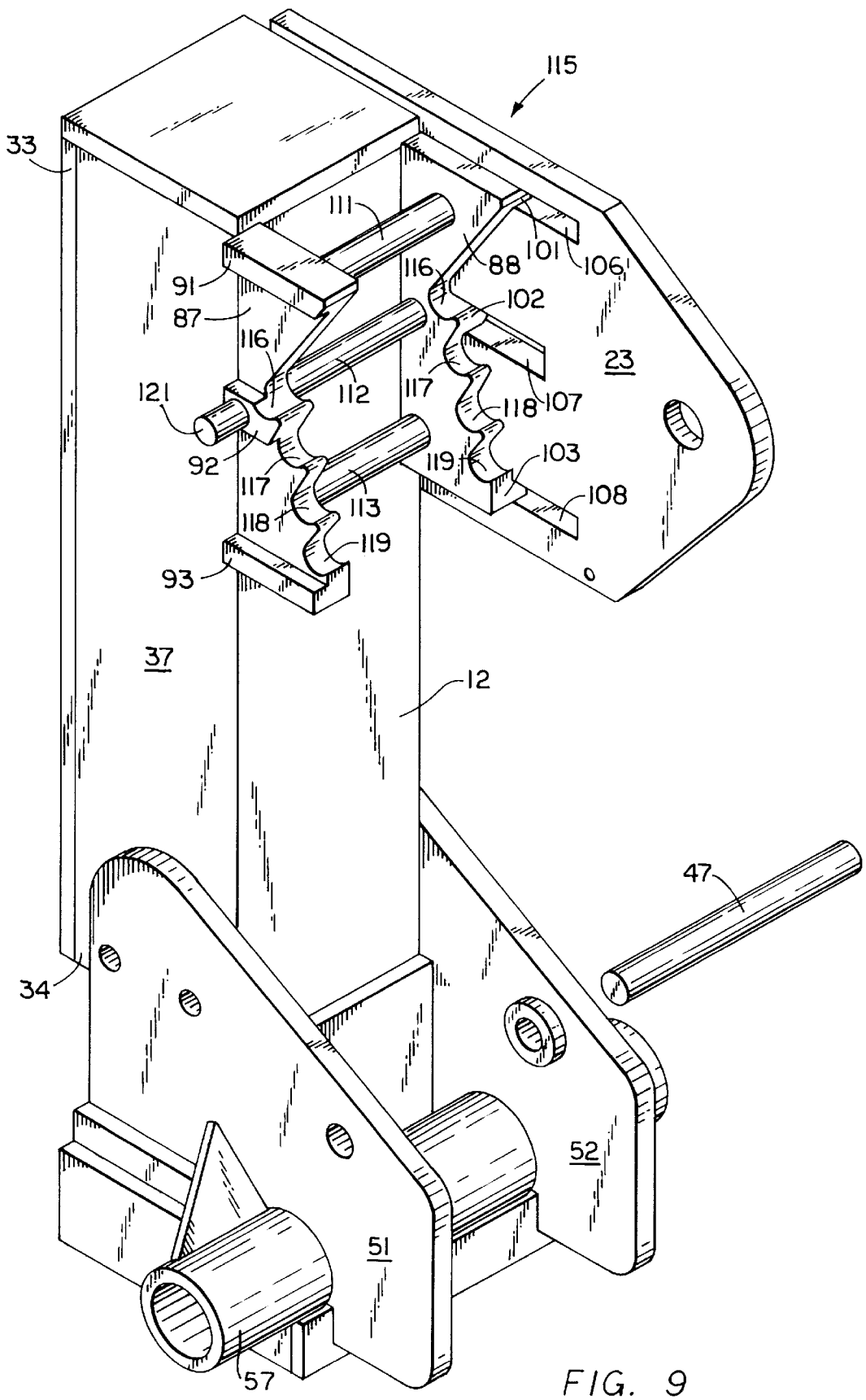
FIG. 9 is a portion of the lifting mechanism and the safety brake apparatus, according to an embodiment of this invention.
Figure 10:
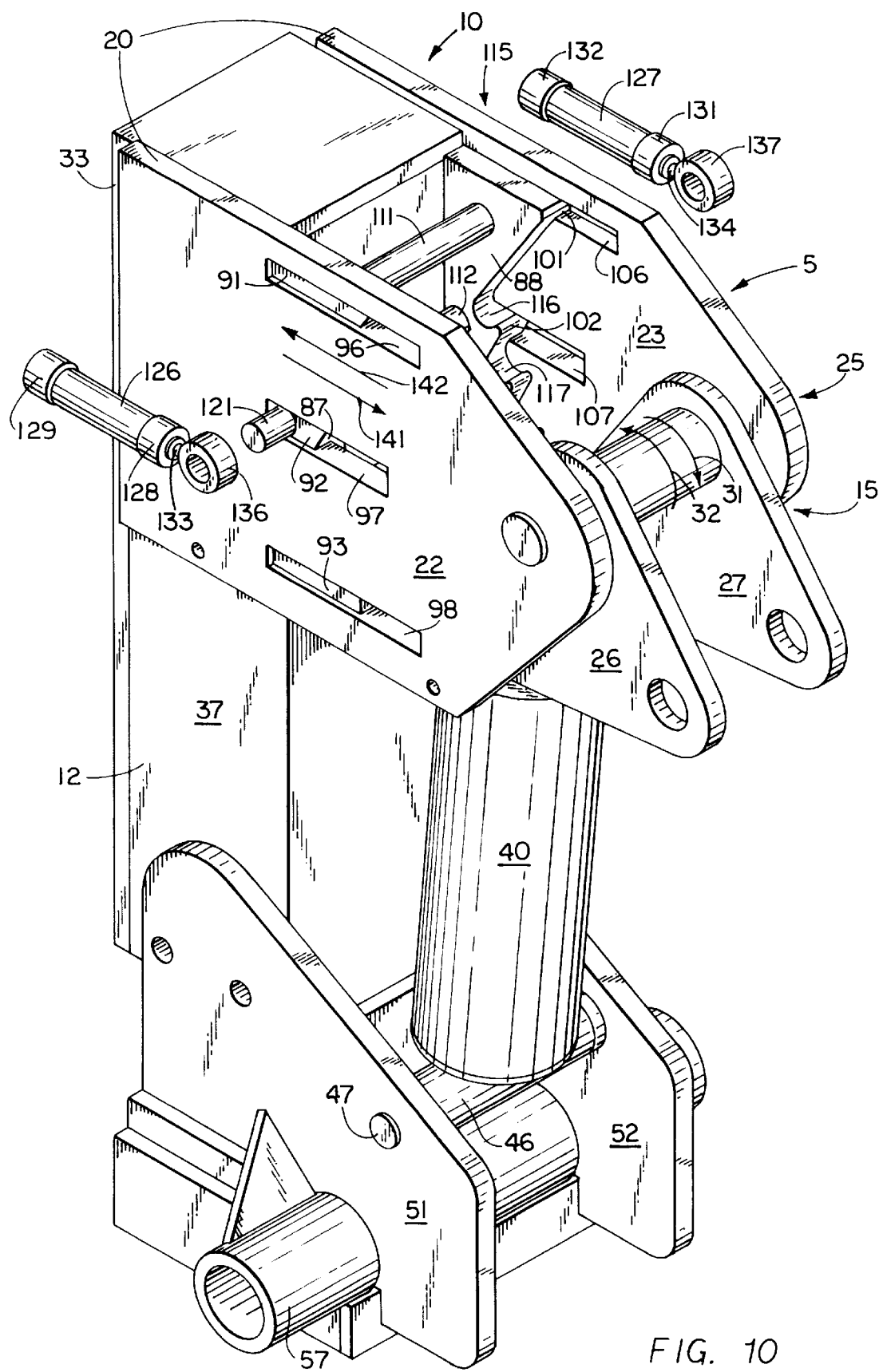
FIG. 10 is a partially exploded perspective diagram of the lifting mechanism and the safety brake apparatus, according to an embodiment of this invention.
Figure 11:
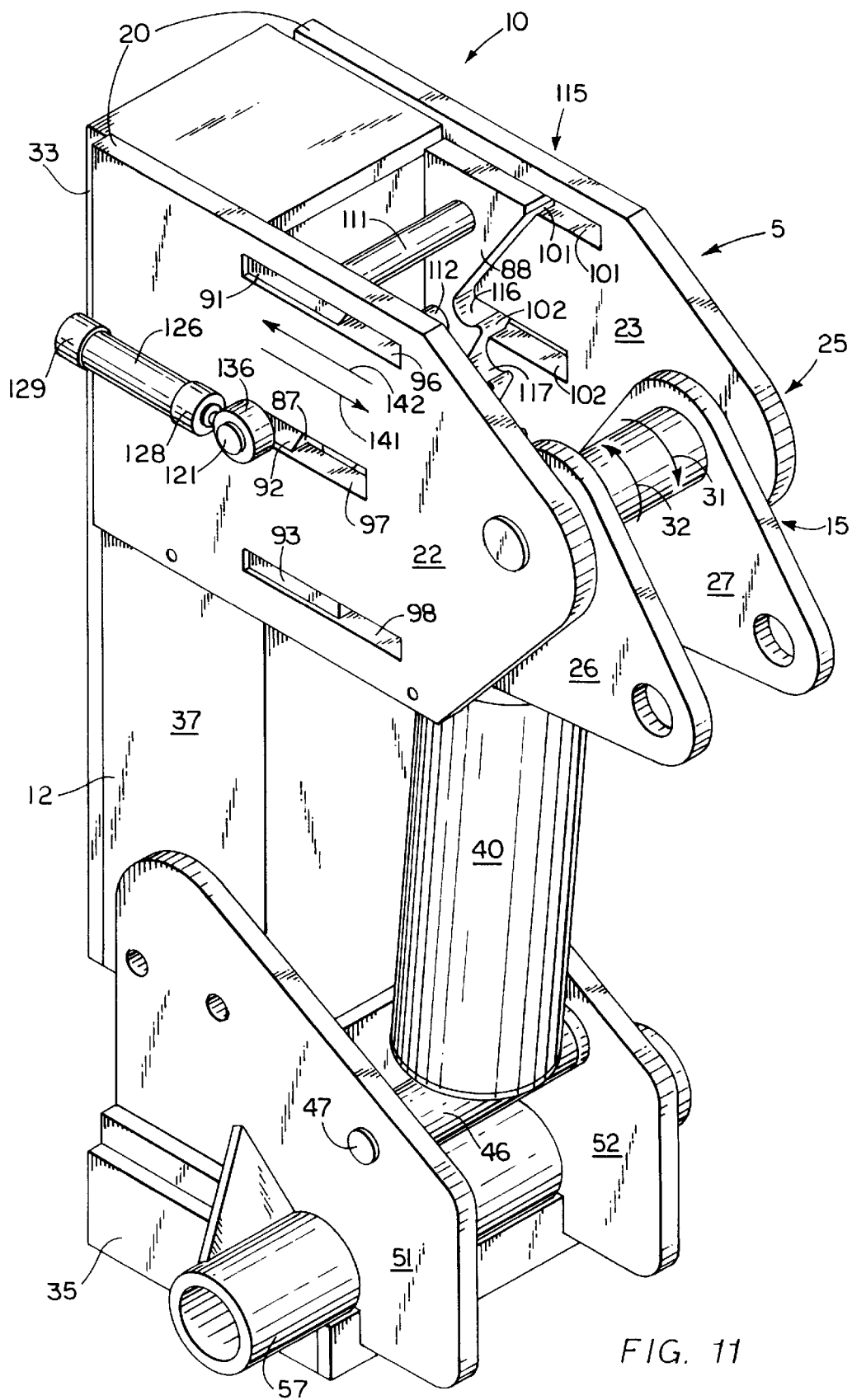
FIG. 11 is a perspective diagram of the lifting mechanism and the safety brake apparatus, according to an embodiment of this invention.
Figure 18:
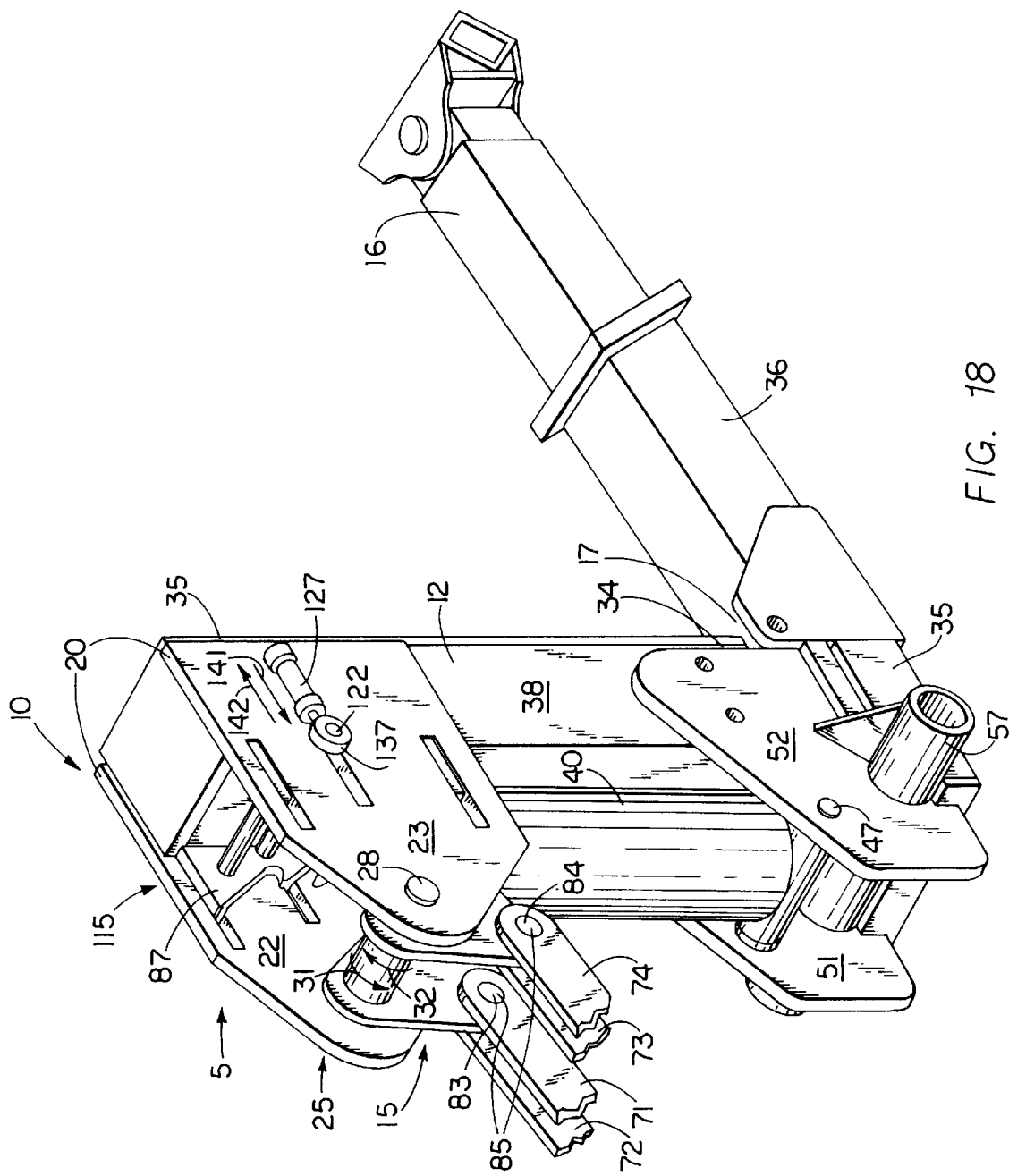
FIG. 18 is a cut away perspective diagram of the safety brake apparatus for a lifting mechanism, according to an embodiment of this invention.

As specifically detailed in FIG. 8, the pair of riser plates 20 include a first riser plate 22 and a second riser plate 23. As shown in FIGS. 1, 2, 3, 9, 10, 11, 12 and 15, the riser has a first side 37, and as shown in FIGS. 16, 18, and 19, the riser has a second side 38. Preferably, as shown in FIG. 10, the first riser plate is mounted to the first side of the riser, most preferably near the top end 33 of the riser member. Conversely, the second riser plate is mounted to the second side of the riser, also most preferably near the top end of the riser member.

Figure 4:
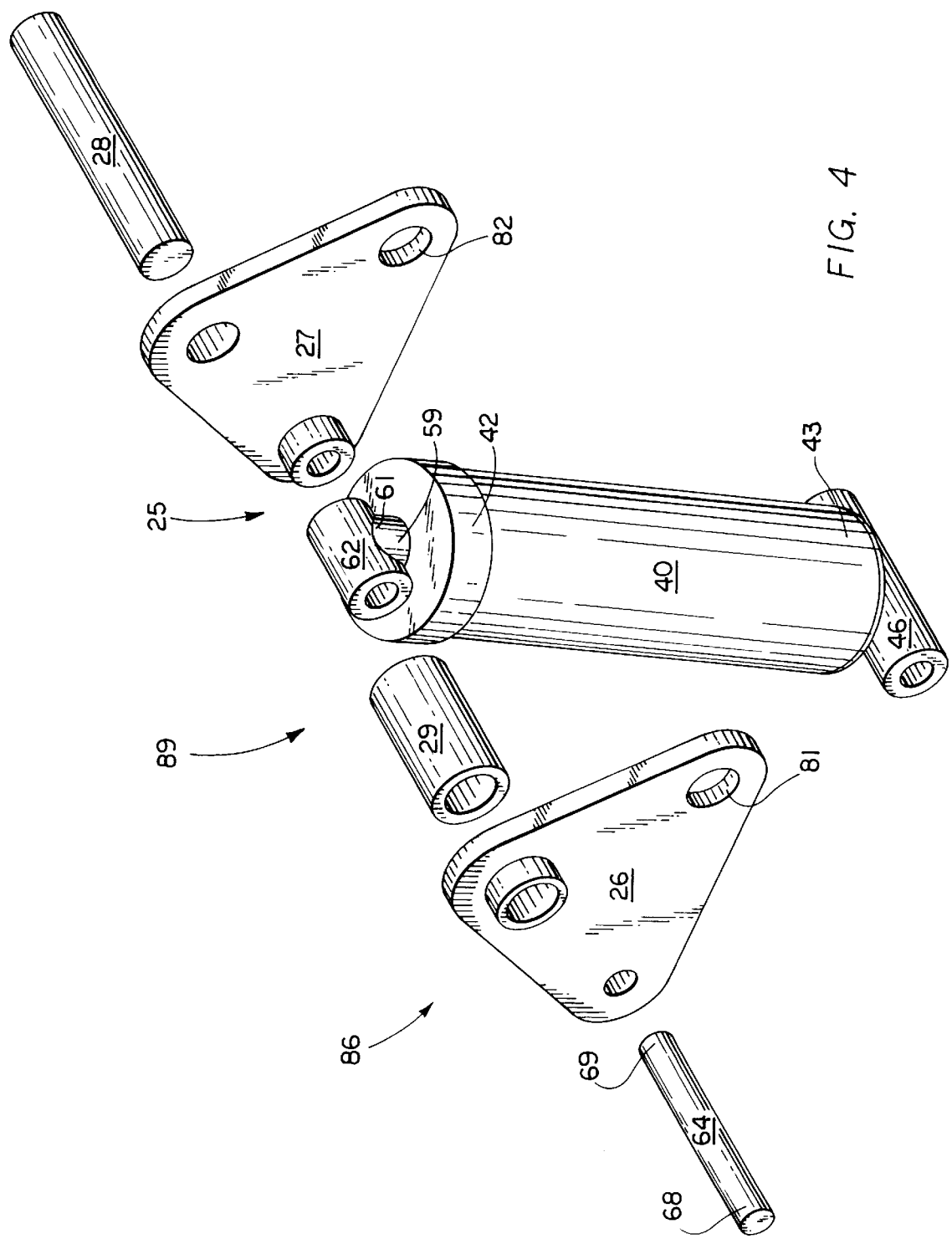
FIG. 4 is a portion of the lifting mechanism and the safety brake apparatus according to an embodiment of this invention.
Figure 5:
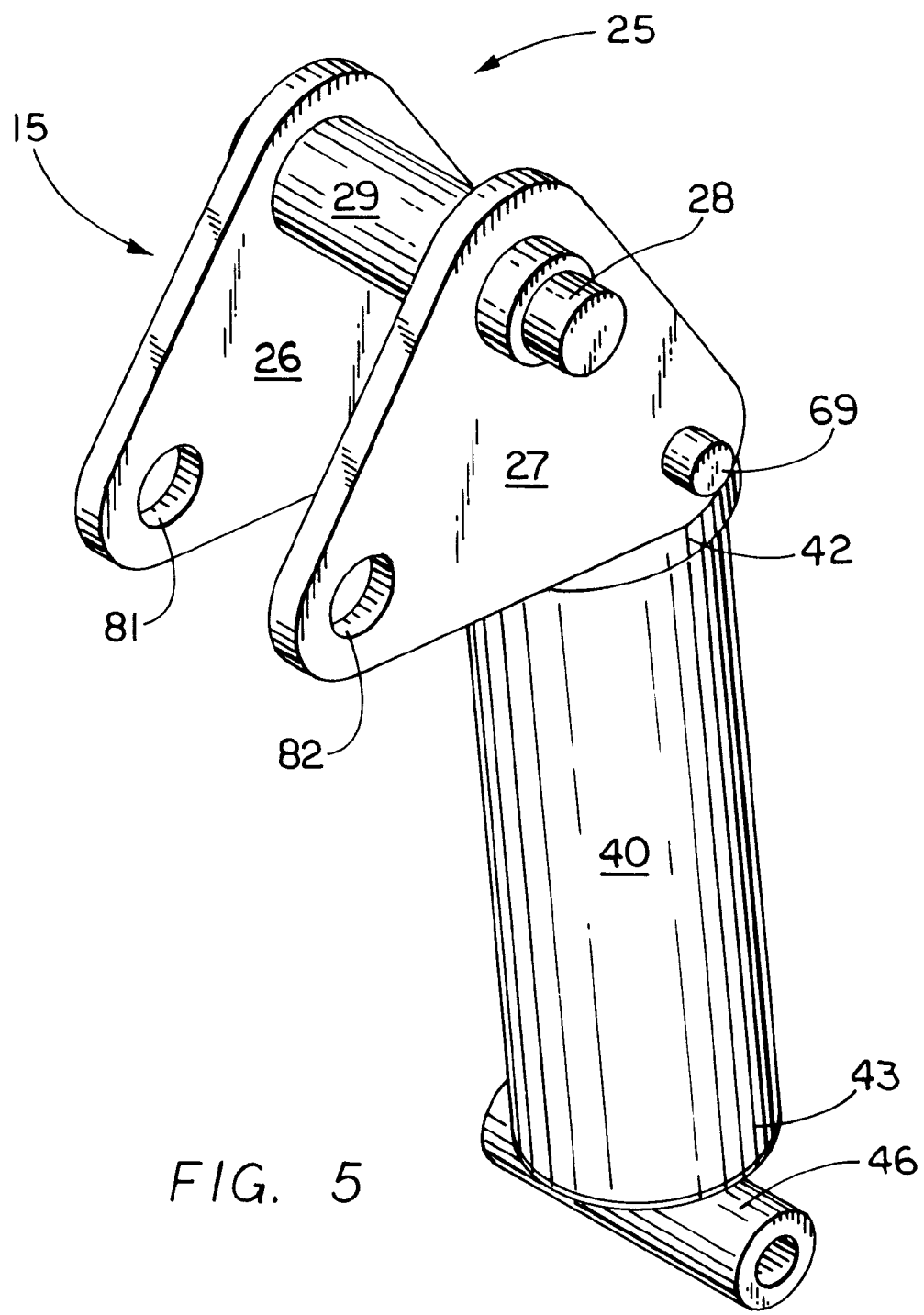
FIG. 5 is a portion of the lifting mechanism and the safety brake apparatus according to an embodiment of this invention.

As specifically detailed in FIGS. 4 and 5, the camming crank preferably includes a first cam plate 26 and a second cam plate 27. As shown in FIGS. 1, 2, 10, 11, 12, 13, 14, 15, 16, 17, 18 and 19, the pair of riser plates 20 and the camming crank 15 are joined in a pivoting connection. This pivoting connection, is herein referred to as a riser pivot 25. The riser pivot preferably includes an riser pivot pin 28 that connects the first cam plate 26 to the second cam plate 27. The first cam plate and the second cam plate are preferably separated by a riser pivot sleeve 29 to form a riser bracket 30. The riser bracket of the camming crank is received within the cam bracket of the pair of riser plates. The camming crank rotates about the riser pivot pin in either a forward rotation 31 or a rearward rotation 32.

Figure 3:
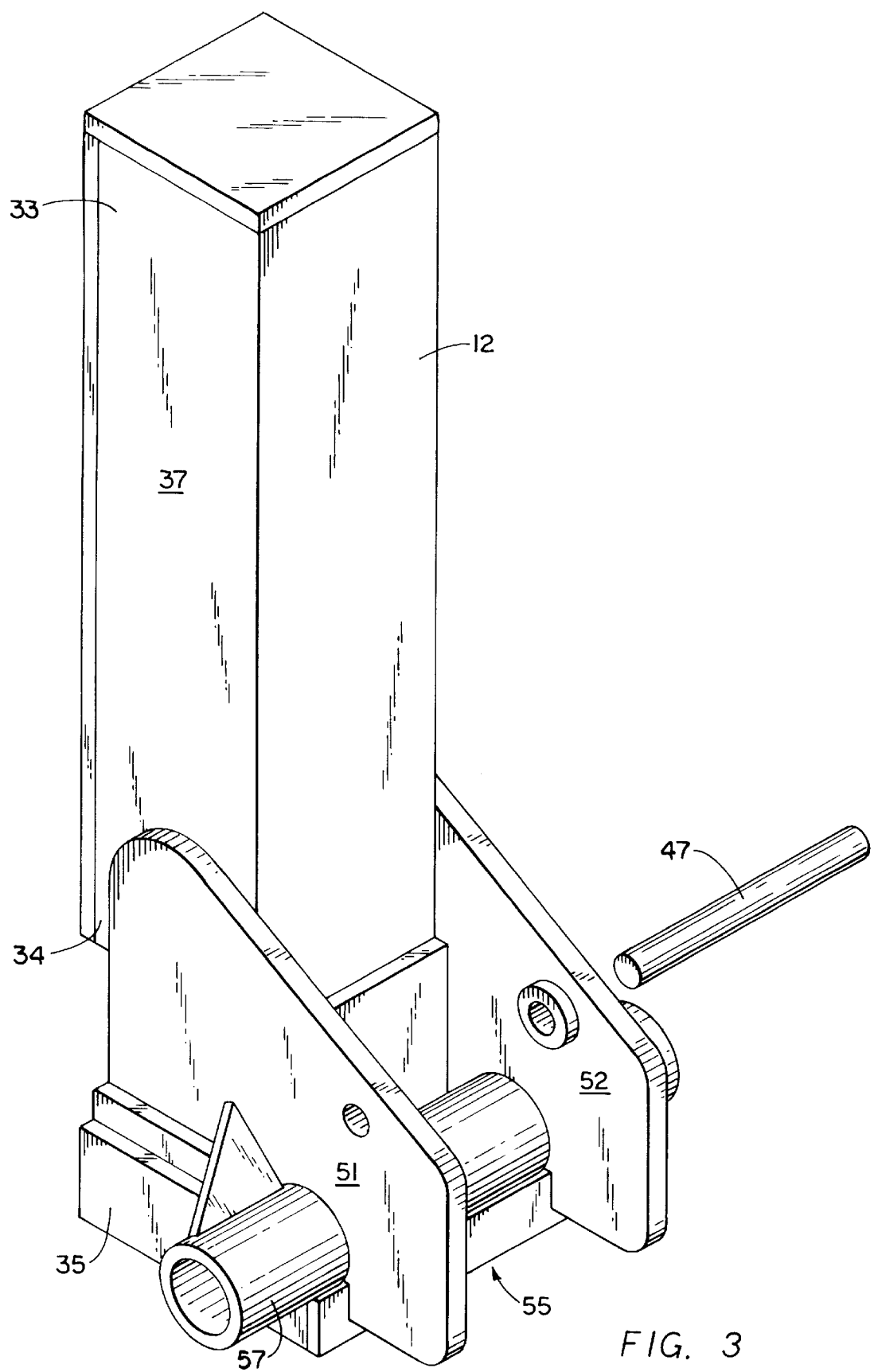
FIG. 3 is a portion of the lifting mechanism for receiving the safety apparatus according to an embodiment of this invention.

As specifically shown in FIG. 3, the riser member 12 has a top end 33 and a base end 34. The riser member is mounted to an anchor body 35, proximate the base end of the riser member. As shown in FIG. 18, the anchor body is also attached to a boom leg 36. Preferably, the boom leg is located proximate the base end of the riser member. Alternatively, the riser member may attach directly to the boom leg, but for structural strength and ease of manufacture, the mounting of the riser member to the anchor body is preferably utilized. Most preferably, the boom leg has a free end 16 for attachment to a wheel lifting assembly, and an anchor end 17 mounted to the anchor body at approximately a 90° angle to the riser member. The wheel lifting assembly can be any conventional design that employs a boom leg similar to the boom leg as shown in FIGS. 18 and 19.

The riser member also includes a first riser side 37 and a second riser side 38. The second riser side is shown in FIGS. 18 and 19. The pair of riser plates 20 are preferably attached proximate the top end 33 of the riser member, as specifically shown in FIGS. 1, 2, 10, 11, 12, 17 and 18. The first riser plate 22 is mounted to the first riser side 37. Additionally, a second riser plate 23 is mounted to the second riser side 38, as detailed in FIGS. 18 and 19.

As shown in FIGS. 1, 2, 10, 11, 12, 13, 14, 15, 17, 18, and 19, the lifting apparatus 10 also includes a crank actuator 40 for rotating the camming crank 15 about the riser pivot 25. The crank actuator includes an upper crank actuator end 42 and a lower crank actuator end 43. The lower crank actuator end includes an anchor pivot 45. The anchor pivot hingeably connects the lower end of the crank actuator to the anchor body 35. An anchor pivot sleeve 46 is mounted proximate the lower crank actuator end. The anchor pivot sleeve receives an anchor pivot pin 47. The anchor body includes a first anchor plate 51 and a second anchor plate 52. The first anchor plate and the second anchor plate form an anchor bracket 55. The anchor pivot pin is received into the anchor bracket, allowing the crank to rotate on the anchor body about the anchor pivot.

The anchor body 35 also includes a base frame pivot 57. As shown in FIGS. 1, 2, 10, 11, 12, 15, 16, 18 and 19, the base frame pivot connects the anchor body to a frame member 58. The frame member is most preferably integral to a towing vehicle 60, as shown in FIG. 19. The base frame pivot is preferably located within the anchor body proximate the anchor pivot 55. The boom leg 36 is also mounted to the anchor body. The boom leg can therefore be selectively raised or lowered by pivoting the boom leg on the base frame pivot.

The lifting apparatus 10 utilizes the camming crank 15 to push or pull the riser member 12 about the base frame pivot 57. The camming crank levers the riser member with the aid of link arms 70 that are pivotally connected to an arm anchor 65. As shown in FIG. 19, the arm anchor preferably includes a first arm anchor bracket 66 and a second arm anchor bracket 67. Most preferably, camming crank is connected to the arm anchor with four link arms, namely a first inner link arm 71 paired with a first outer link arm 72, and a second inner link arm 73 paired with a second outer link arm 74. In the most preferable configuration, as also shown in FIG. 19, the first inner link arm and the first outer link arm sandwich the first anchor bracket to form a first arm anchor pivot 76.

Correspondingly, a second anchor arm pivot 77 is formed by the second inner link arm and the second outer link arm sandwiching the second arm anchor bracket.

The camming crank 15 includes link arm brackets. As detailed in FIG. 5, the link arm brackets preferably comprise a first link arm bracket 81 on the first cam plate 26 and a second link arm bracket 82 on the second cam plate 27. As shown in FIGS. 18 and 19, the first inner link arm 71 and the first outer link arm 72 sandwich the first link arm bracket to form a first link arm pivot 83. Correspondingly, the second inner link arm 73 and the second outer link arm 74 sandwich the second link arm bracket to form a second link arm pivot 84. The first link arm pivot and the second link arm pivot together form a link arm pivot pair 85.

In an alternative embodiment, instead of the link arm pair 85, a single link arm pivot could be formed by including a single link arm pivot interconnecting the first link arm bracket 81 and the second link arm bracket 82. For this alternative embodiment, a single link arm could be employed to connect the arm anchor to the camming crank. Additionally in this single link arm embodiment, a single arm anchor pivot would replace the first arm anchor pivot 76 and the second arm anchor pivot 77.

As also shown in FIG. 19, when the camming crank 15 is turned in the forward rotation 31, the riser member pivots toward the arm anchor 65 that is mounted to the towing vehicle 60. This rotation of the camming crank in the forward rotation thereby causes the free end 16 of the boom leg 36 to rise. Conversely, when the camming crank is turned in the rearward rotation 32, the riser member pivots away from the arm anchor. The turning of the camming crank in the rearward rotation causes the free end of the boom leg to lower.

As previously discussed herein, the camming crank 15 is preferably rotated by the crank actuator 40. As further detailed in FIG. 4, the crank actuator includes an actuator piston 59. The upper crank actuator end 42 receives the actuator piston. The actuator piston has a terminal end 61. The terminal end of the actuator piston includes an actuator piston sleeve 62 for receiving an actuator pivot pin 64. As detailed in FIGS. 4 and 17, the first cam plate 26 and the second cam plate 27 of the camming crank also include a brake post bracket 86. The actuator pivot pin is received into the brake post bracket. The brake post bracket, the actuator piston sleeve and the actuator pin together comprise an actuator pivot 89.

Figure 17:
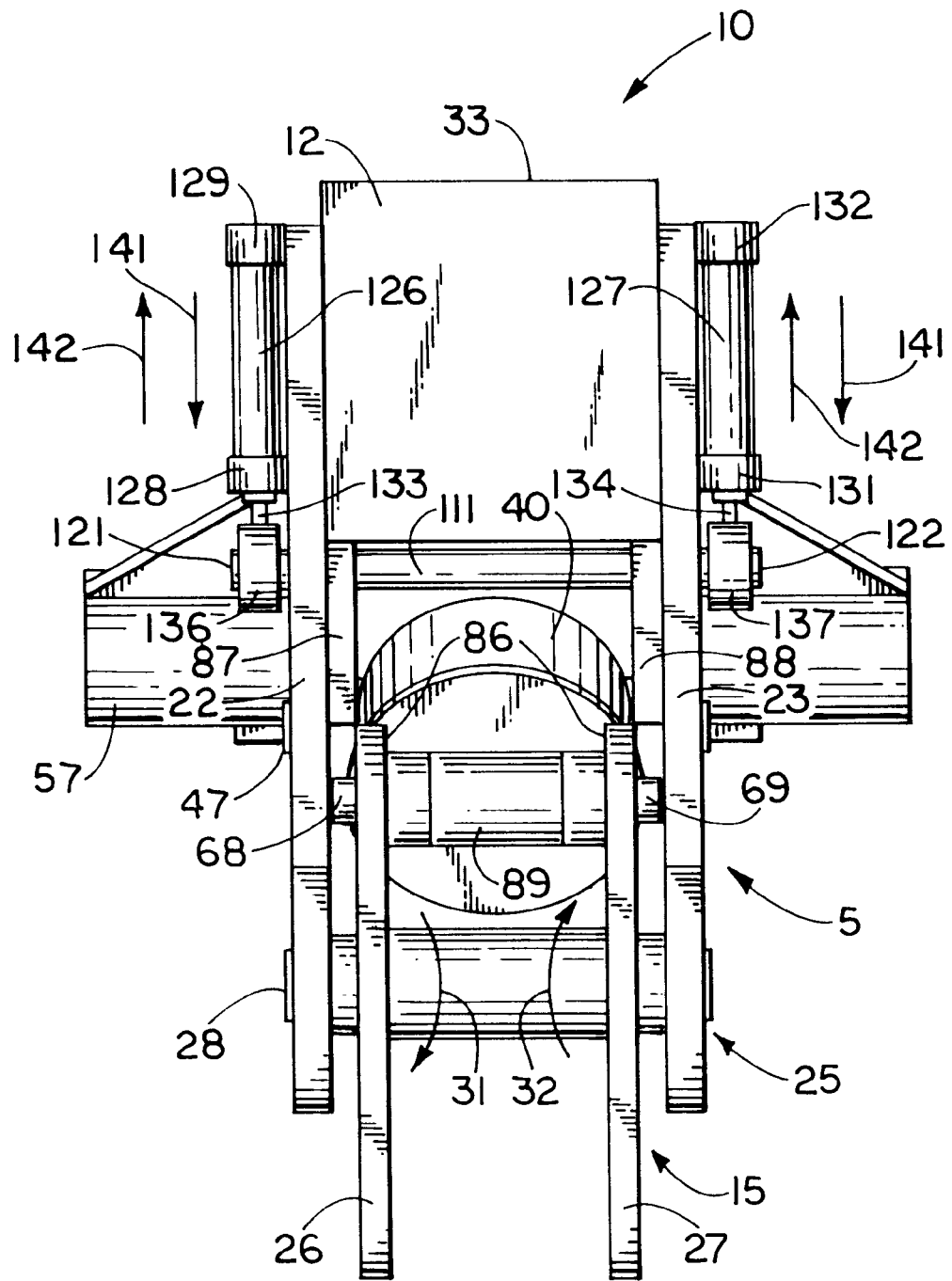
FIG. 17 is a top view diagram of the lifting mechanism and the safety brake apparatus according to an embodiment of this invention.

The camming crank 15 also includes at least a single brake post. As shown in FIGS. 1, 2, 4, 12, 13, 14, 15 and 19, a first brake post 68 preferably extends from the first cam plate 26. Correspondingly, as shown in FIGS. 4, 5 and 17, a second brake post 69 extends from the second cam plate 27. Most preferably, as shown in FIG. 4, the first brake post and the second brake post are extensions of the actuator pivot pin 64. The actuator pivot pin extends through the first cam plate to form the first brake post and conversely extends through the second cam plate to form the second brake post.

In a preferred embodiment of the safety brake apparatus 5 of the present invention, the first riser plate 22 and the second riser plate 23 of the riser member 12 each receive a slider plate. As shown in FIGS. 1, 2, 10, 11, 12, 16, 18, and 19, a first slider plate 87 is received by and slides bi-directionally along the first riser plate, guided by a plurality of first slider plate keys. The first slider plate keys are received within corresponding first riser plate keyways within the first riser plate. Similarly, as shown in FIGS. 1, 2, 9, 10, 11, 12, 18 and 19, a second slider plate 88 slides bi-directionally along the second riser plate 23, also guided by a plurality of second slider plate keys. The second slider plate keys are received within corresponding second riser plate keyways in the second riser plate. Alternatively, a single key could be received into a single first riser plate keyway in each of the slider plates and riser plates respectively, or reversed with the riser plates having keys and the slider plate with corresponding keyways employed to guide the slider plates along the riser plates. Most preferably, however, three slider plate keys are utilized on both the first and second slider plates, with mating riser plate keyways on the first and second riser plates, respectively.

As most preferred and shown in FIGS. 1, 2, 8, 9, 10, 11, 12, 13, 14, 15, 16 and 18, the first slider plate 87 includes a first upper key 91, a first middle key 92, and a first bottom key 93. Correspondingly, the first riser plate 22 includes a first upper keyway 96, a first middle plate keyway 97, and a first bottom keyway 98. Similarly, as most preferred and also shown in FIGS. 6, 9, and 10, the second slider plate 88 includes a second upper key 101, a second middle key 102, and a second bottom key 103. Correspondingly, the second riser plate 23 includes a second upper keyway 106, a second middle plate keyway 107, and a second bottom keyway 108.

The first slider plate 22 is preferably separated from the second slider plate 23 by separator bars. Most preferably, as shown in FIGS. 1, 6, 7, 12, and 16, an upper separator bar 111, a middle separator bar 112 and a lower separator bar 113 are utilized to separate the first slider plate from the second slider plate and assure that the slider plates operate as a single unit and maintain the keys of the slider plates within the respective keyways of the slider plates. The single unit comprising the slider plates and the separator bars, as described above, is herein referred to as a slider plate assembly 115.

The slider plates also include at least a single post rest. Preferably, the first slider plate 87 and the second slider plate 88 each include a plurality of post rests. Most preferably, as shown in FIGS. 1, 2, 6, 7, 9, 12, 13, 14, 15 and 16, and specifically shown in FIGS. 6 and 7, the first slider plate and the second slider plate each include four paired post rests. The post rest pairs are herein referenced from bottom to the top as a first post rest pair 116, a second post rest pair 117, a third post rest pair 118 and a fourth post rest pair 119.

The slider plates additionally include a mechanism for moving the slider plates along the riser plates. Preferably, the slider plates include posts that attach to a pair of brake actuators. Most preferably, as shown in FIGS. 1, 2, 6, 7, 9, 10, 11, 12, 13, 14, 15, 16 and 17, the first slider plate 87 includes a first slider plate post 121, and as shown in FIGS. 6, 7, 16, 17, 18 and 19, the second slider plate includes a second slider plate post 122.

Figure 6:
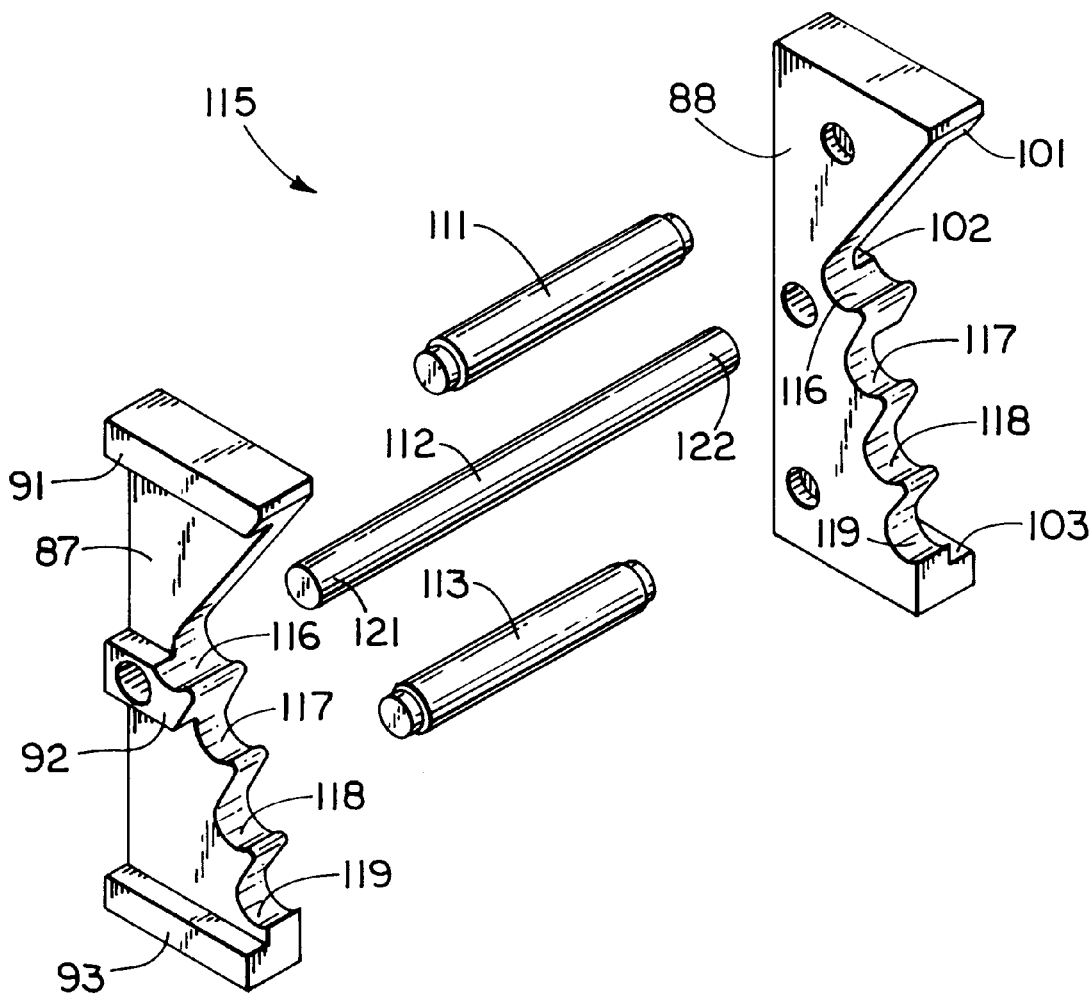
FIG. 6 is an exploded perspective diagram of a portion of the safety brake apparatus, according to an embodiment of this invention.
Figure 7:
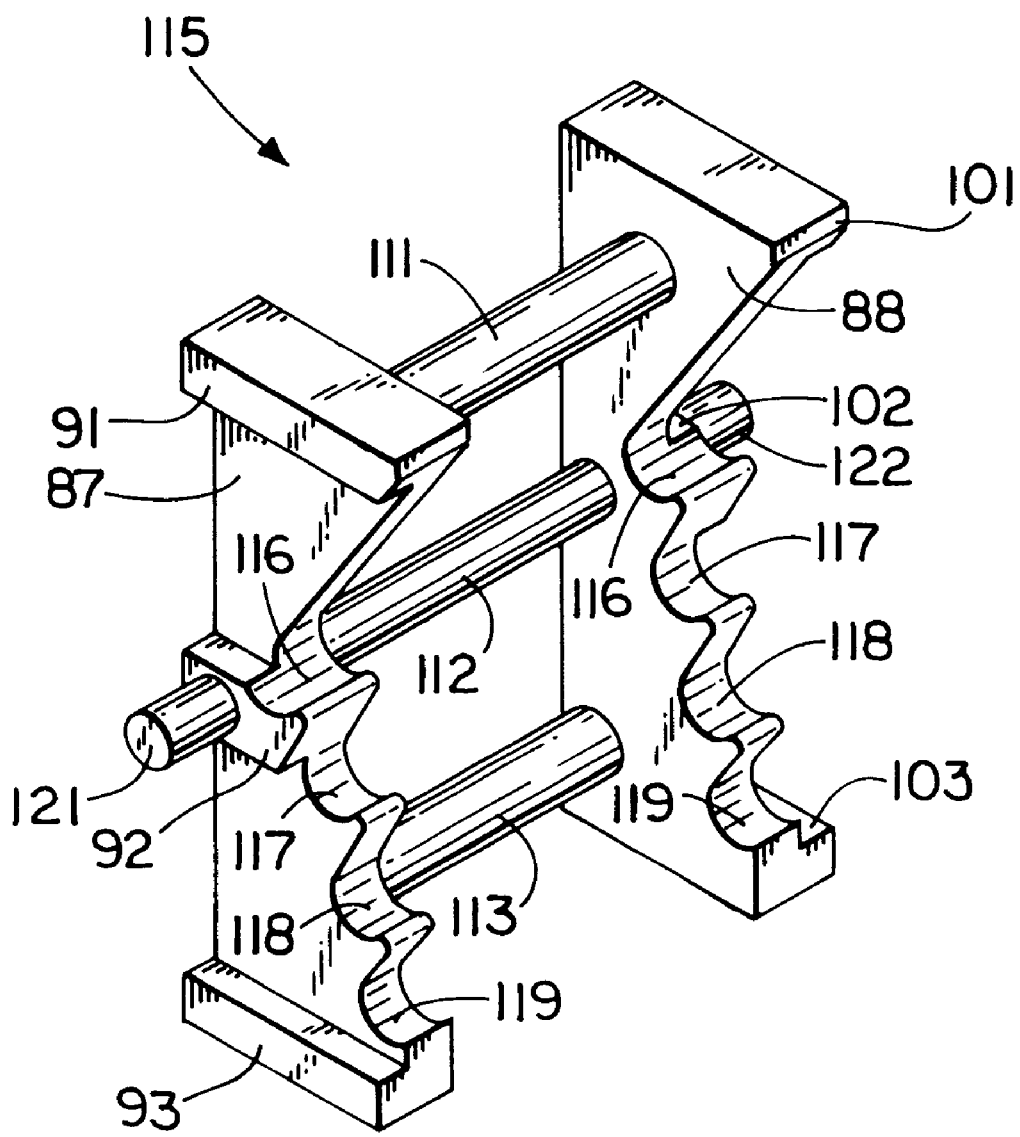
FIG. 7 is a portion of the safety brake apparatus, according to an embodiment of this invention.

The slider plate posts are preferably extensions of one of the separator bars. Most preferably, as shown in FIGS. 6 and 7, the first slider plate post 121 is an extension of the middle separator bar 112. In this preferred configuration, the middle separator bar post penetrates through the first slider plate 87 and is received through the first middle keyway of the first riser plate. Correspondingly, as also shown in FIGS. 6 and 7, the second slider plate post 122 is also an extension of the middle separator bar. To function as the second slider plate post, the middle separator bar penetrates through the second slider plate 88 and is received through the second middle keyway 107 of the second riser plate.

The slider plates are preferably attached to a pair of hydraulically powered brake actuators. Alternatively, pneumatic actuators or electric motors could be employed. Also alternatively, a single brake actuator could be utilized, or multiple brake actuators. However, as shown in FIGS. 1, 2, 10, 11, 12, 13, 14, 15, and 17, a first brake actuator 126 is preferably mounted to the first riser plate 22 and a second brake actuator 127 is mounted to the second riser plate 23, as shown in FIGS. 10, 17, 18 and 19. Most preferably, the first brake actuator includes a first forward brake actuator mount 128 for attachment to the first riser plate and a first rearward brake actuator mount 129 also attached to the first riser plate. Correspondingly, the second brake actuator preferably includes a second forward brake actuator mount 131 attached to the second riser plate and a second rearward brake actuator mount 132, also attached to the second riser plate.

As specifically shown in FIGS. 10 and 17, the first brake actuator 126 and the second brake actuator 127, respectively include a first brake piston 133 and a second brake piston 134. The first brake piston can extend from or retract into the first brake actuator. The first brake piston terminates with a first brake bearing 136. The first brake bearing receives the first slider plate post 121 of the first slider plate 87. The first brake piston can extend from or retract into the first brake actuator. Similarly, the second brake piston terminates with a second brake bearing 137. The second brake bearing receives the second slider plate post 122 of the second slider plate 88.

The first brake actuator 126 and the second brake actuator 127 operate in unison to move the first slider plate 87 and the second slider plate 88 forward or rearward. As shown in FIG. 1, movement of the slider plate assembly 115 in a forward direction 141 engages the first brake post 68 and the second brake post 69 of the camming crank 15 with one of the post rest pairs.

Figure 2:
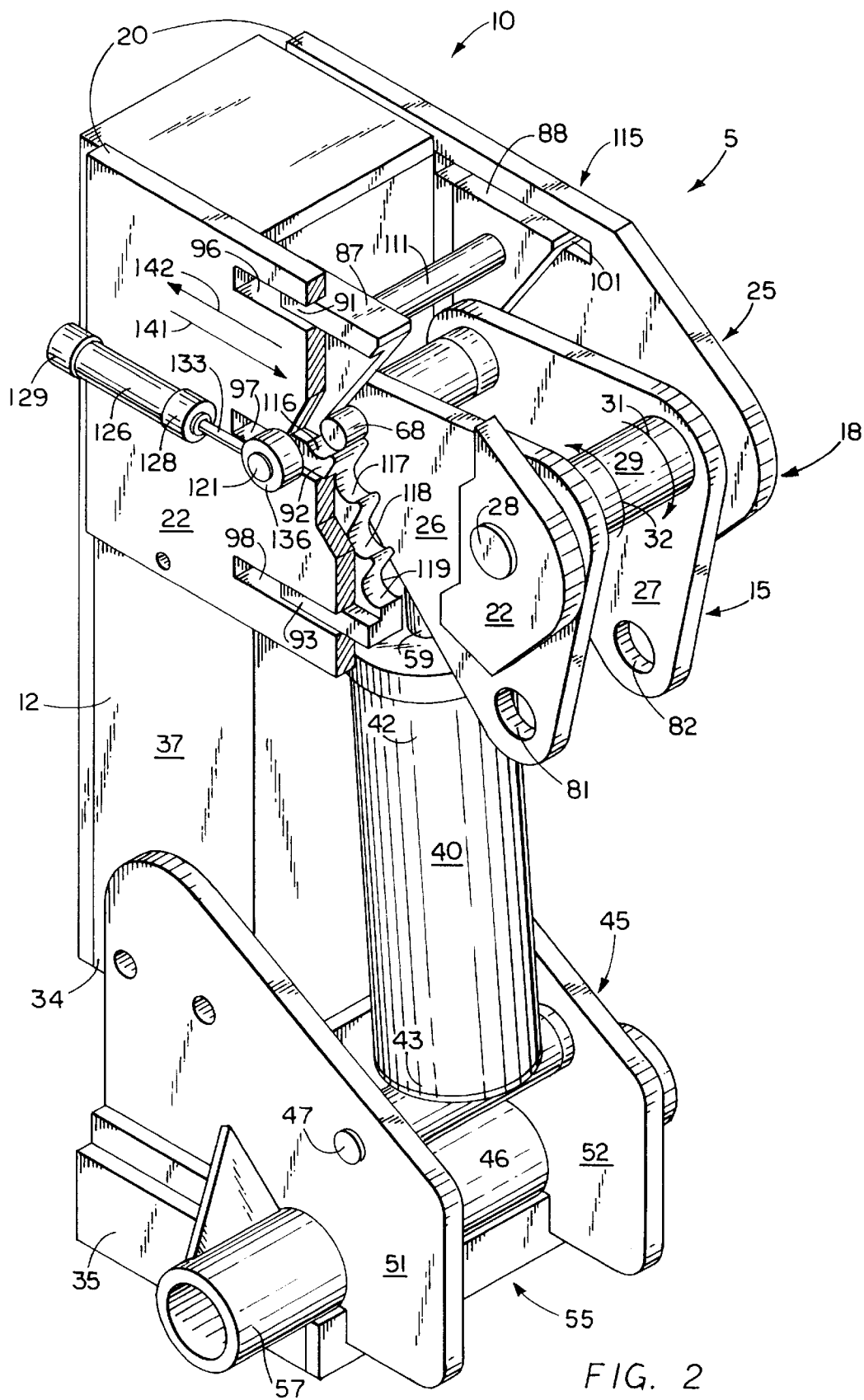
FIG. 2 is a sectioned perspective diagram of the safety brake apparatus for the lifting mechanism, according to an embodiment of this invention.
Figure 13:
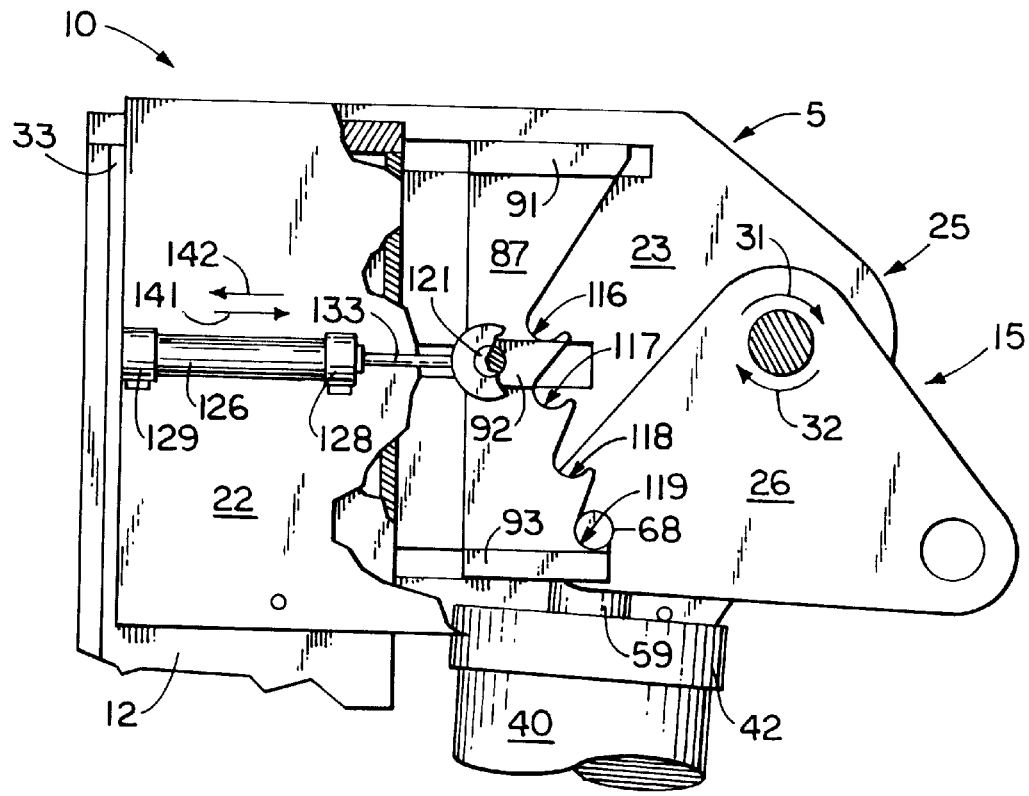
FIG. 13 is a partial cut away side elevation diagram of the safety brake apparatus for a lifting mechanism, according to an embodiment of this invention.
Figure 14:
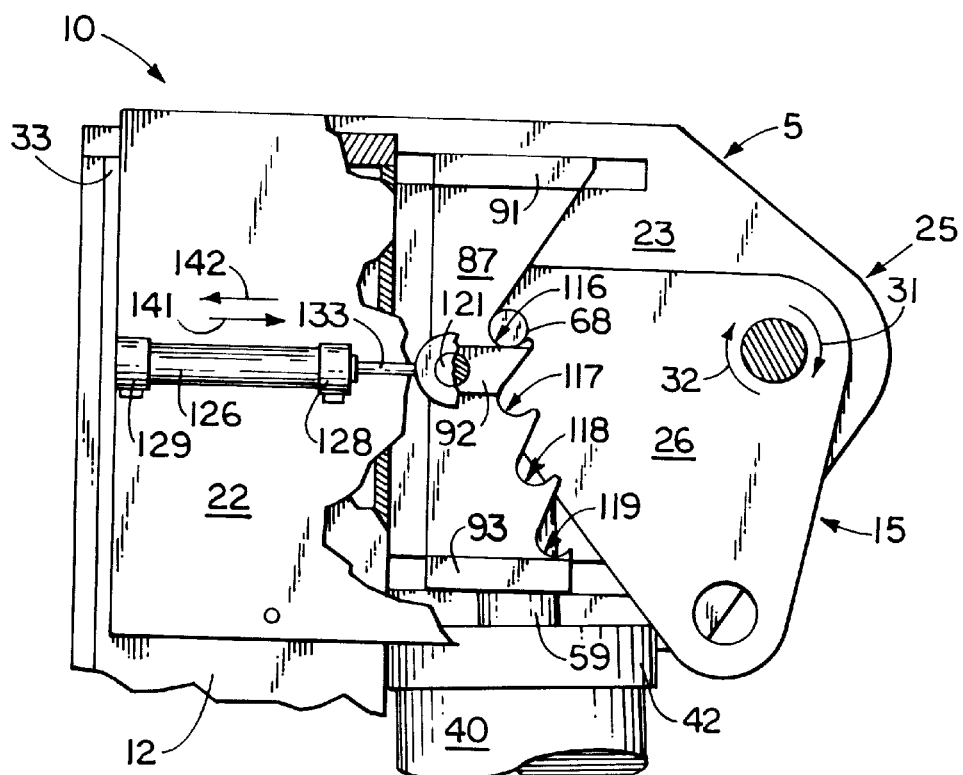
FIG. 14 is a partial cut away side elevation diagram of the safety brake apparatus for a lifting mechanism, according to an embodiment of this invention.

FIGS. 2 and 13 show the first post rest pair 116 on the first slider plate 87 engaging the first brake post 68. This forward position of the slider plate assembly 115 is also refereed to herein as a safety position.

Figure 12:
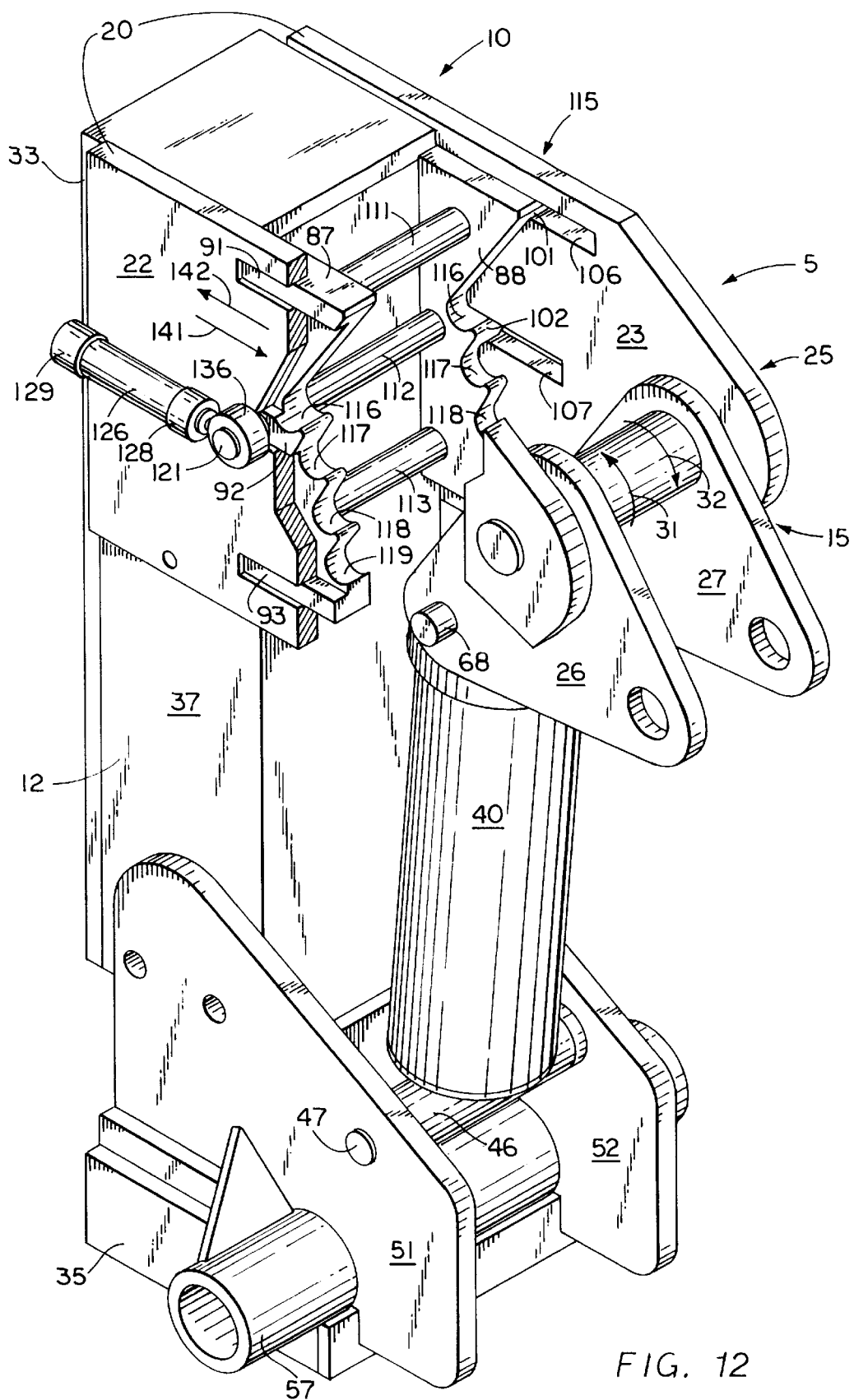
FIG. 12 is a cut away perspective diagram of the safety brake apparatus for a lifting mechanism, according to an embodiment of this invention.
Figure 15:
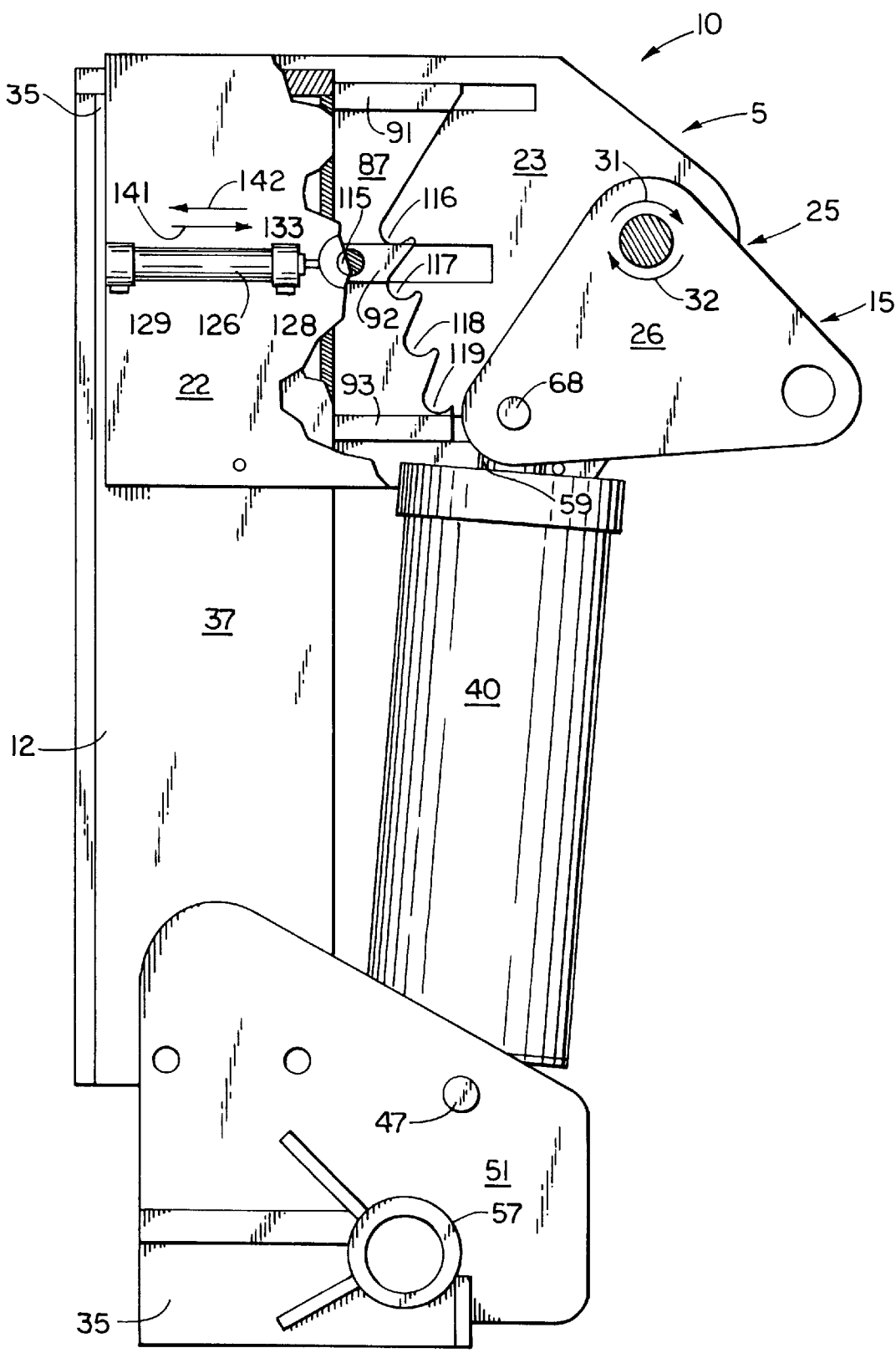
FIG. 15 is a partially cut away side elevation diagram of the safety brake apparatus for a lifting mechanism, according to an embodiment of this invention.
Figure 16:
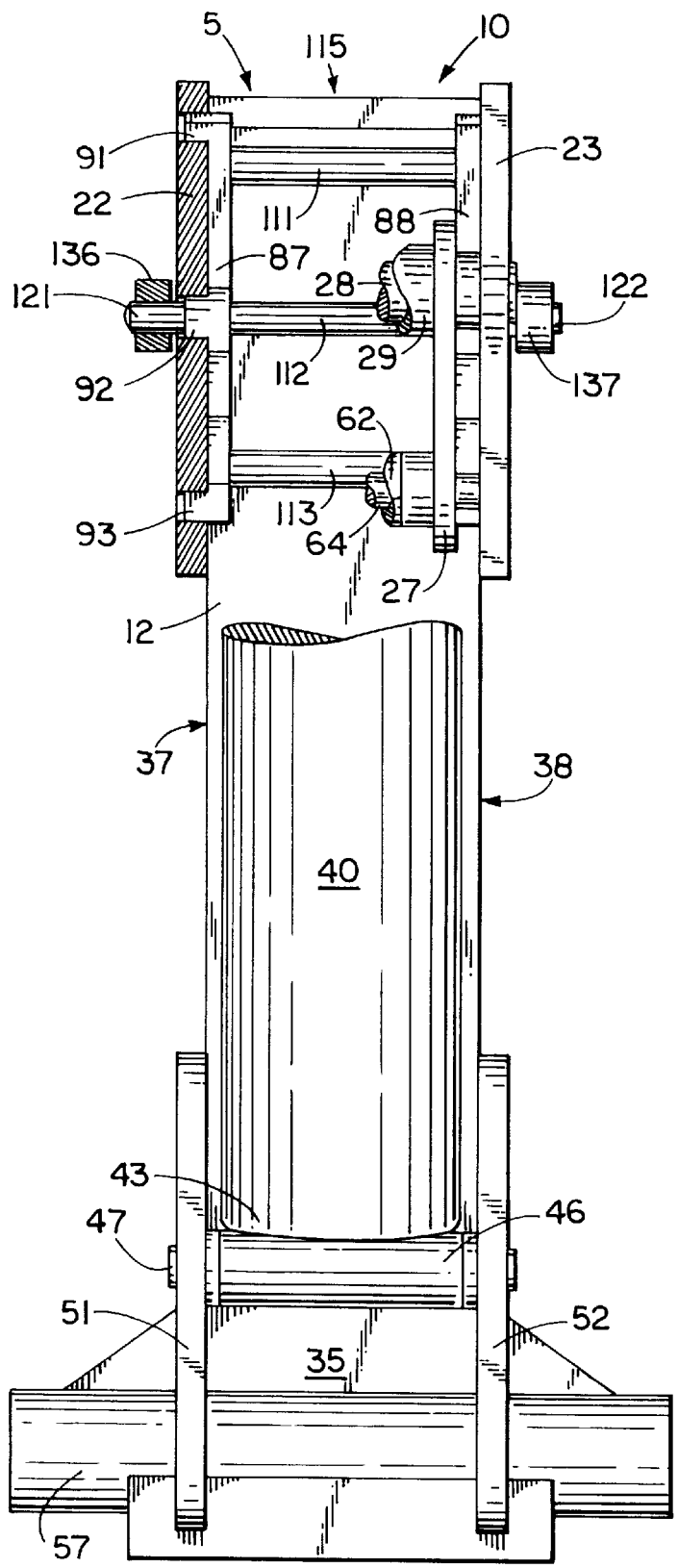
FIG. 16 is a partially cut away end elevation diagram of the safety brake apparatus for a lifting mechanism, according to an embodiment of this invention.

As shown in FIGS. 12 and 15, movement of the slider plate assembly 115 in a rearward direction 142 disengages the first brake post 68 and the second brake post 69 from the first slider plate 87 and the second slider plate 88, respectively. This rearward position of the slider plate assembly is also referred to herein as a retracted position.

Once the first brake post 68 and second brake post 69 are engaged by the slider plate assembly 115, the camming crank 15 can only rotate forward. Constraining the camming crank to the forward rotation 31 also constrains the riser 12, in that the riser can then only pivot in the forward direction 141, and only raise the attached boom leg 36.

The camming crank 15 has three primary points of pivoting attachment; the riser plate pivot 25, the link arm pivot pair 85 and the actuator pivot 89. To operate the present invention, the crank actuator 40 either extends to push upon, or retracts to pull upon the camming crank, thereby forcing the camming crank to respectively rotate about the riser plate pivot, in either the forward rotation 31 or the rearward rotation 32, to then respectively either pull or push upon the link arms 70.

To raise free end 16 of the boom leg 36, the crank actuator 40 extends and pushes the actuator pivot 89 of the camming crank 15 upward, and thereby rotates the camming crank 15 in the forward rotation 31, as shown in FIG. 17. As the camming crank turns in this direction of forward rotation, the link arm pivot pair 85 pulls upon the link arms 70, while the arm anchor 65 remains static, as shown in FIG. 19. The top end 33 of the riser 12 pivots in a forward direction 141 as it is pulled toward the arm anchor by the rotation of the camming crank. Additionally, the first brake post 68 and the second brake post 69, which are located proximate the actuator pivot, also rise as the forward rotation of the camming crank pivots the riser forward.

When it is desired to prevent the camming crank from movement in the rearward rotation 32, the slider plates are each actuated in the forward direction 141 and into the safety position. The slider plate assembly 115 engages the first brake post 68 and the second brake post 69 with one of the multiple pin rests, from the first post rest 116, as detailed in FIGS. 1 and 13, to the fourth pin rests 119, as detailed in FIGS. 2 and 14. The pin rests prevent the downward movement of the actuator pivot and the rearward rotation of the camming crank. The top end 33 of the riser 12 is thereby prevented from tipping in the rearward direction 142 to lower the attached boom leg.

In a hydraulic system failure, or even a slow leak or loss of hydraulic system pressure, the present invention prevents the free end 16 of the boom leg 36 from inadvertently lowering. At typical freeway speeds an inadvertent lowering of a load carried by the boom leg can be catastrophic. The towing vehicle 60 and the attached load can be severely damaged if the load bounces off the boom. An even greater potential for damage is realized if the lowering boom causes the towing vehicle's driver to loose control. The safety brake apparatus 5 of the present invention serves to brake the boom leg 36. The safety brake apparatus also helps to prevent the riser member from inadvertently moving in the rearward direction 142 without first disengaging the camming crank 15 from the slider plate assembly 115. This feature is especially important when the towing vehicle 60 is transporting a load, such as a disabled vehicle.

Additionally, during the actual raising of the load, such as a disabled vehicle, the safety brake apparatus 5 of the present invention can be utilized to help prevent the boom 36 from inadvertently lowering. The raising of the first brake post 68 and the second brake post 69 can be coordinated with motion of the slider plate assembly 115. For example, as the brake post pair rotates forward, with the forward rotation 31 of the camming crank 15, as soon as the first brake post and the second brake post clears the first post rest, the slider plate assembly can advance in the forward direction 141. Preferably, the first brake post and the second brake post can exert a slight but constant pressure to enable this forward advance as soon as the brake post pairs allow.

Alternatively, it is conceived that the first brake actuator 126 and the second brake actuator 127 could move the slider plate assembly 115 in response to a racheting sensor (not shown), or some similar device, placed to sense rotational movement of the riser pivot 25. The racheting sensor would serve to interlock the forward direction 141 or rearward direction 142 of movement by the first brake actuator and the second brake actuator, with the rotation of the camming crank. This interlocked movement of the first brake actuator and the second brake actuator would thereby move the slider plate assembly forward or rearward in cooperation with the movement of the brake post pair. With the racheting sensor activated and interlocked with the first brake actuator and the second brake actuator, as described above, the safety brake will automatically operate. A lowering of the boom leg 36 results in the forward directional movement of the first brake actuator and the second brake actuator. The slider plate assembly 115 then catches the first brake post 68 and the second brake post 69 with one of the post rests, thereby halting the lowering of the boom leg.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the following claims, as appropriately interpreted in accordance with the doctrine of equivalents.

What is claimed is:

1. A safety brake for a vehicle lifting apparatus comprising:
    a slider plate,
        the slider plate having a minimum of a single slider plate key, and a minimum of a single post rest, each of the single slider plate keys received into a riser plate keyway;
    a minimum of a single brake actuator,
        the brake actuator for sliding the slider plate from a retracted position, forward to a safety position as constrained by the slider plate key within the riser plate keyway, to prevent a rearward rotation of a camming crank;
    a brake post mounted to a cam plate, the brake post receivable into the post rest of the slider plate; and
    the riser plate keyway included in a riser plate of a vehicle lifting apparatus,
    the riser plate also including and a cam bracket for pivotably receiving the camming crank,
    the riser plate mounted to a riser member of the vehicle lifting apparatus;
    the riser member having a top and a base, the base mounted proximate a boom of the vehicle lifting apparatus,
    the camming crank of the vehicle lifting apparatus including the cam plate, and having a link arm bracket, a crank actuator for rotating the camming crank in a forward direction to pivotably raise the boom, and for rotating the camming crank in the rearward direction to pivotably lower the boom.

2. The lifting apparatus of claim 1, wherein the brake actuator is mounted to the riser plate of the vehicle lifting apparatus.

3. The lifting apparatus of claim 1, wherein the riser member and the boom of the vehicle lifting apparatus are joined together and pivotably mounted to a frame.

4. The lifting apparatus of claim 1, wherein the slider plate includes a plurality of slider plate keys, each received into a slider plate keyway.

5. The lifting apparatus of claim 1, wherein the single brake actuator is a plurality of brake actuators.

* * * * *